Nov. 18, 1941.    C. P. DEIBEL    2,262,836

DRY CELL BATTERY UNIT

Filed June 22, 1940    2 Sheets-Sheet 1

Cyril P. Deibel INVENTOR.

BY Hull West + Chilton
ATTORNEYS

Nov. 18, 1941.  C. P. DEIBEL  2,262,836
DRY CELL BATTERY UNIT
Filed June 22, 1940   2 Sheets-Sheet 2

Cyril P. Deibel  INVENTOR.
BY
Hull West + Chilton
ATTORNEYS

Patented Nov. 18, 1941

2,262,836

UNITED STATES PATENT OFFICE 2,262,836

DRY CELL BATTERY UNIT

Cyril P. Deibel, Lakewood, Ohio

Application June 22, 1940, Serial No. 341,911

8 Claims. (Cl. 136—107)

This invention relates to a dry cell battery unit which is particularly well adapted for use as a flashlight cell, but which is also suitable for any use where a leakproof cell or battery unit is required.

One of the objects of the invention is to provide a dry cell battery unit which consists of one or more cells enclosed within a casing and sealed therein in such a manner that any leakage which may occur as a result of excessive pressure generated within the cell will be retained within the outer casing and will not be permitted to escape.

A further object of the invention is to provide a dry cell unit which consists essentially of an outer metal casing which is preferably in the form of an extruded zinc shell and in which is arranged a dry cell in the form of an extruded zinc cup the bottom wall of which is of substantially greater thickness than the side walls thereof, the zinc cup being insulated from the outer casing by means of a thin layer of suitable insulating material which serves also to provide a liquid tight closure at both ends of the metal casing, the upper end of the unit being closed by a metal closure member which extends over the carbon electrode and has electrical contact therewith.

A further object of the invention is to provide a dry cell battery unit having the above described distinguishing features and characteristics and which is also provided with a strip of porous material such as paper which is preferably disposed between the zinc cup and outer casing and provides means for preventing excessive gas pressure within the cell without permitting the liquid contents of the cell to escape.

Figure 1:
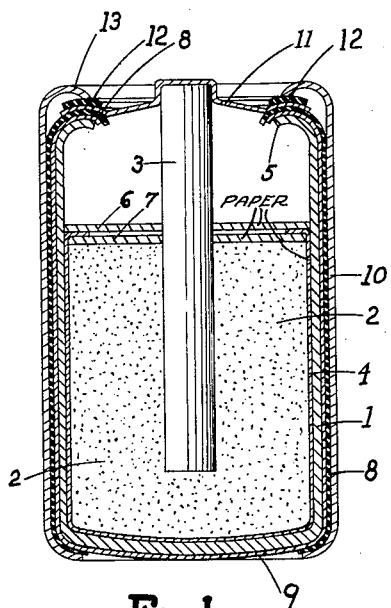
Figure 2:
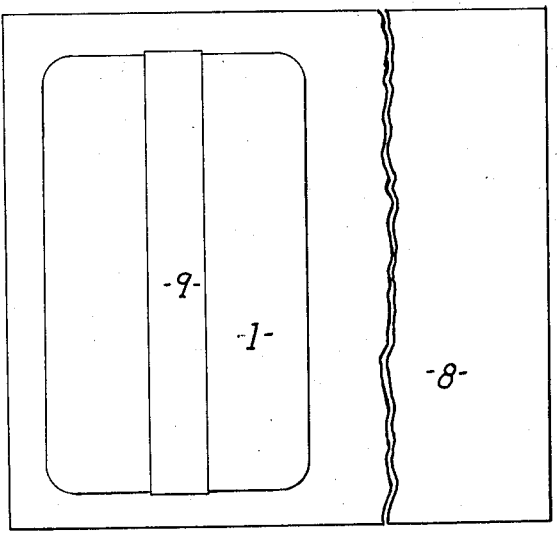
Figure 3:
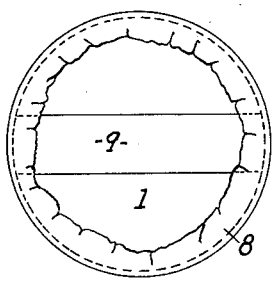
Figure 4:
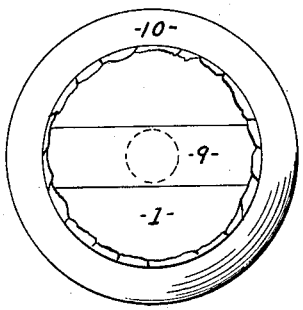
Figure 5:
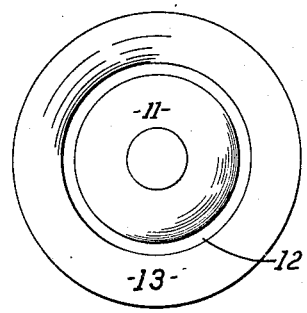
Figure 6:
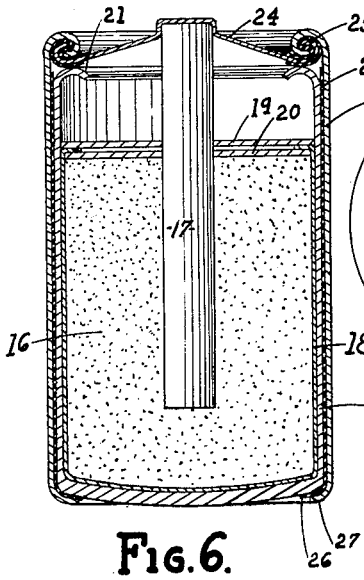
Figure 7:
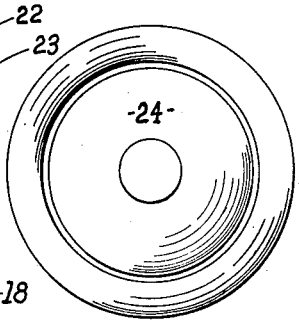
Figure 8:
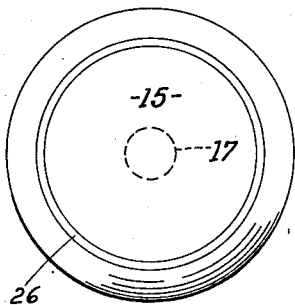
Figure 9:
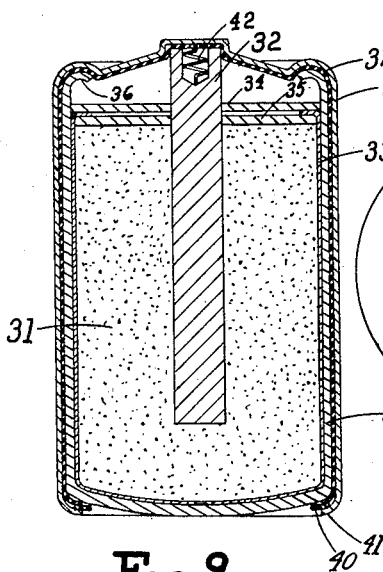

Further and more limited objects of the invention will appear as the description proceeds and by reference to the accompanying drawings in which Fig. 1 is a vertical sectional view of my improved cell; Fig. 2 is a somewhat diagrammatic view showing how the thin layer of insulating material is wrapped about the zinc cup; Fig. 3 is a bottom plan view of the zinc cup shown in Fig. 1 with the layer of insulating material thereon; Fig. 4 is a bottom plan view of the zinc cup with insulating material thereon; Fig. 5 is a top plan view of the cell shown in Fig. 1; Fig. 6 is a vertical sectional view disclosing a slightly modified form of my invention; Figs. 7 and 8 are top and bottom plan views, respectively, of the cell shown in Fig. 6; Fig. 9 is a vertical sectional view illustrating a second modification of my invention; and Figs. 10 and 11 are top and bottom plan views respectively of the cell shown in Fig. 9.

Referring now to the drawings, Figs. 1 to 5 inclusive, the reference character 1 designates a zinc cup which is preferably extruded in such manner that the bottom wall thereof is of substantially greater thickness than the side walls thereof. Arranged within the zinc cup is a mass of mix 2 and a carbon electrode 3. The mass of mix is preferably enclosed by a paper liner 4 and the upper end of the container is preferably bent over inwardly as shown at 5. Surrounding the carbon electrode and extending over the top of the mass of mix are a pair of paper washers 6 and 7. The zinc cup or shell 1 is preferably enclosed by a thin layer of suitable insulating material 8 such as "Pliofilm." Extending about the zinc cup is a thin strip 9 of porous material such as paper or the like, the purpose of which will hereinafter appear. The zinc cup is enclosed within an outer casing 10 which is preferably formed of metal. It will be noted that the layer of "Pliofilm" extends over both the upper and lower edges of the zinc cup and that the carbon electrode extends a considerable distance thereabove. Disposed over the upper end of the carbon electrode and resting on the inturned upper edge of the zinc can is a metal cover member 11 the outer edges of which are curved to fit the curved upper end of the zinc can. Disposed over the closure member 11 is an insulating washer 12 and the upper end of the metal casing 10 is spun over inwardly as shown at 13 and bears against the washer 12 and cooperates with the washer, closure member and the layer of "Pliofilm" to form a liquid tight closure for the upper end of the unit. The lower end of the metal casing 10 is also spun over inwardly and cooperates with the lower end of the layer of "Pliofilm" to provide a liquid tight closure for the lower end of the unit. In assembling the unit the outer metal shell is first spun over inwardly at one end as shown at 13. The insulating washer 12 is next inserted and then the metal closure member 11. The cell with the layer of "Pliofilm" thereon is next inserted and the unit placed in a suitable fixture and considerable pressure exerted on the bottom of the zinc can; and with the parts held in that position, the lower end of the outer metal shell is spun over inwardly so that the cell is secured within the outer casing under considerable pressure. It will be noted that the mass of mix does not completely fill the zinc cup and that there is a sufficient space left at the top thereof to provide a gas chamber. It will also be noted that the insulating sleeve 8 and metal cover member 11 completely close the upper end of the battery unit and prevent any leakage of liquid therefrom as a result of excessive pressure generated within the cell. The layer of "Pliofilm" performs the dual function of insulating the cell from the outer casing and of providing a liquid tight casing for both ends of the unit. The strip of paper or other porous material 9 extends entirely around the zinc cup and provides a means for permitting excessive pressure within the cell to be relieved without permitting the liquid contents of the cell to escape. The strip 9 extends across the exposed bottom of the zinc cup and may contain a date indicating the age of the cell.

In Fig. 6 I have disclosed a slightly modified form of dry cell battery unit which consists of an extruded zinc cup 15 having a bottom wall of greater thickness than the side walls and which contains a mass of mix 16 and a carbon electrode 17, the mix being insulated from the cup by a paper liner 18. Surrounding the carbon electrode and extending over the mass of mix are a pair of washers 19 and 20. The upper end of the zinc cup is turned over inwardly as indicated at 21. The zinc cup is completely enclosed by a layer of insulating material 22 which may be formed of paper, "Pliofilm" or other suitable material. The zinc cup is enclosed within an outer metal casing 23. Closing the upper end of the unit is a closure member 24 the outer peripheral edge of which is coated or covered with a thin layer of suitable insulating material. The upper edge of the metal casing 23 and the peripheral edge of the metal closure member 24 are seamed or rolled together as indicated at 25 so as to provide a liquid tight closure. The lower end of the layer of insulating material 22 extends over the bottom edge of the zinc cup as shown at 26 and the lower edge of the metal container 23 is spun over inwardly as shown at 27 and cooperates with the layer of insulating material to provide a liquid tight closure for the bottom end of the unit. In assembling this form of cell the metal closure member 24 and the outer metal casing 23 may be first secured together. The cell with the layer of insulating material 22 thereon may then be inserted with the upper end of the carbon electrode engaging in the recess provided in the closure member. The unit is then placed in a suitable fixture and pressure exerted on the bottom of the zinc cup; and with the parts held in this position, the lower end of the outer metal casing is spun over inwardly so that the cell is secured within the outer casing under considerable pressure. It will be noted that the zinc cup is thoroughly and completely insulated from the outer metal shell and that a liquid tight joint is provided at opposite ends of the unit. The paper strip 9 shown in Figs. 1 to 5 inclusive may also be used with this form of the invention if desired.

Figure 10:
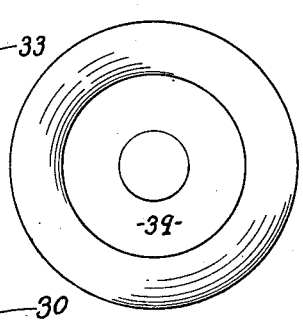
Figure 11:
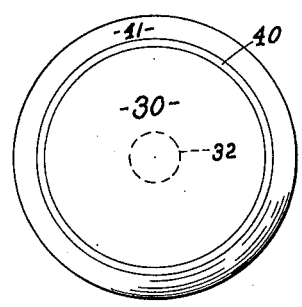

In Figs. 9 to 11, inclusive, there is disclosed a second modification of my invention which consists of an extruded zinc cup 30 having a bottom wall of greater thickness than the side walls and which contains a mass of mix 31 and a carbon electrode 32, the mix being insulated from the zinc cup by a paper liner 33. Fitting over the carbon electrode and covering the mass of mix are a pair of insulating washers 34 and 35. The upper end of the zinc can is turned over inwardly as shown at 36. The zinc cup is enclosed by a sleeve or jacket 37 formed of suitable insulating material. This layer of insulating material extends over the lower peripheral edge of the zinc cup a slight distance. The dry cell is enclosed within an outer metal shell or casing 39 which is shaped in section as shown most clearly in Fig. 9. Disposed over the lower end of the zinc cup is an insulating washer 40 and the lower end of the cup or shell 39 is spun over inwardly as shown at 41 so as to form a liquid tight closure for the lower end of the unit. The upper end of the carbon electrode is recessed and receives therein a spring-like member 42 the upper end of which projects through an opening in the jacket 37 and engages with the outer casing so as to provide an electrical connection between the carbon electrode and the outer casing. In assembling this form of the invention the cell proper is first enclosed within the insulating jacket 37. The metal cup or shell 39 is then placed thereover. The parts are then placed within a suitable fixture and pressure is exerted upon the lower end of the cup; and with the parts held in this position the lower end of the cup or shell 39 is spun over inwardly so as to provide a liquid tight joint, so that the cell is secured within the metal casing under considerable pressure. The paper strip 9 may also be used with this form of the invention, if desired.

It will now be clear that I have provided a dry cell battery unit which will accomplish the objects of the invention as hereinbefore stated. The improved constructions herein disclosed provide a dry cell battery unit which has exceptionally long shelf life as well as active life and in which the possibility of leakage of the liquid contents of the cell is eliminated or at least reduced to a minimum.

It will, of course, be understood that the various forms of the invention herein disclosed are to be considered merely as illustrative and not in a limiting sense as various changes may be made in the details of construction, choice of material and arrangement of parts without departing from the spirit of my invention. It is, of course, contemplated that the battery unit may consist of two or more dry cells where heavy duty service is required. The invention is therefore limited only in accordance with the scope of the appended claims.

Having thus described my invention, what I claim is:

1. A dry cell battery unit comprising an outer metal casing, a dry cell arranged within said casing and comprising a metal container containing a mass of mix and a carbon electrode, means insulating said container from said casing comprising a thin layer of insulating material extending over both the upper and lower edges of said container, a metal closure member extending over said carbon electrode and closing both said container and outer casing and insulated therefrom, means forming an electrical connection between said metal closure member and carbon electrode, a porous strip disposed between said outer casing and container and having communication with the interior of said cell and providing means for relieving excessive pressure within said cell without permitting the liquid contents of the cell to escape therethrough.

2. A dry cell battery unit comprising an outer metal casing, a dry cell arranged within said casing and comprising a metal container containing a mass of mix and a carbon electrode, means insulating said container from said casing comprising a layer of distensible insulating material extending over both the upper and lower edges of said container, a metal closure member extending over said carbon electrode and closing both said container and outer casing and insulated therefrom and means forming an electrical connection between said metal closure member and carbon electrode, the upper end of said casing being bent over inwardly and holding said closure member in place and the lower end of said casing being bent over inwardly and cooperating with said layer of insulating material to form a liquid tight closure for the lower end of said unit, a porous strip disposed between said outer casing and container and having communication with the interior of said cell and providing means for relieving excessive pressure within said cell without permitting the liquid contents of the cell to escape therethrough.

3. A dry cell unit comprising an extruded zinc cup, a mass of mix and a carbon electrode disposed within said zinc cup, an outer casing enclosing said zinc cup, a thin layer of insulating material insulating said outer casing from said zinc cup, a metal closure member closing the upper end of said cup and outer casing and having electrical contact with said carbon electrode and insulated from said outer casing and cup, the lower end of said outer casing being bent over inwardly and cooperating with said layer of insulating material to form a liquid tight closure for the lower end of said unit, and a venting strip extending about said zinc cup and leading to the exterior thereof and having communication with the interior of said cell and serving to vent excessive pressure within said cell without permitting the liquid contents thereof to escape.

4. A dry cell battery unit comprising a zinc cup containing a mass of mix and a carbon electrode, an outer casing surrounding said zinc cup, a layer of insulating material insulating said casing from said cup, a separate metal closure member closing the upper end of said zinc cup and casing and insulated therefrom and having electrical contact with said carbon electrode, the lower end of said outer casing being bent over inwardly and cooperating with said layer of insulating material to form a liquid tight closure for the lower end of said unit, and a venting strip extending about said zinc cup and leading to the exterior thereof and having communication with the interior of said cell and serving to vent excessive pressure within said cell without permitting the liquid contents thereof to escape.

5. A dry cell battery unit comprising an extruded zinc cup, the upper end of said casing being bent over inwardly, an outer casing surrounding said zinc cup, a layer of insulating material insulating said outer casing from said cup, a metal closure member for the upper end of said unit extending over said carbon electrode and the inwardly turned upper end of said zinc cup, an insulating washer disposed over said metal closure member, the upper end of said outer casing being bent over inwardly and engaging said washer and holding said closure member in place and providing a liquid tight connection, the lower end of said outer casing being bent over inwardly and cooperating with said layer of sealing material to form a liquid tight closure for the lower end of said closure, and means for venting excessive pressure within said battery unit comprising a porous strip extending about said zinc cup and leading to the exterior thereof and having communication with the interior of said cell.

6. A dry cell battery unit comprising an extruded zinc cup containing a mass of mix and a carbon electrode, an outer casing surrounding the said zinc cup, a layer of insulating material extending about said zinc cup and over the upper end thereof and insulating the same from the outer casing, the lower end of said outer casing being bent over inwardly and engaging said layer of insulating material and cooperating with the bottom of said zinc cup to provide a liquid-tight closure for said unit, means providing an electrical connection between said outer casing and said carbon electrode, and means for venting excessive pressure within said battery unit comprising a porous strip extending about said zinc cup and leading to the exterior thereof and having communication with the interior of said cell.

7. A dry cell battery unit comprising an outer metal casing, a dry cell arranged within said casing and comprising a metal container containing a mass of mix and a carbon electrode, means insulating said container from said casing comprising a thin layer of insulating material extending over both the upper and lower edges of said container, a metal closure member extending over said carbon electrode and closing both said container and outer casing and insulated therefrom and means forming an electrical connection between said closure member and carbon electrode, a strip of porous material disposed between said outer casing and said metal container and providing means for venting excessive gas pressure within the cell, without permitting the liquid contents of said cell to escape therethrough.

8. A dry cell battery unit comprising a zinc cup containing a mass of mix and a carbon electrode, an outer metal casing surrounding said zinc cup, a layer of electrical insulating material insulating said casing from said cup and extending over the opposite ends thereof, a metal closure member closing the upper end of said zinc cup and casing and insulated therefrom and having electrical contact with said carbon electrode, the lower end of said casing being bent over inwardly and engaging said layer of insulating material and cooperating with the bottom of said zinc cup to form a liquid tight closure for the lower end of said battery unit, a strip of porous material formed of paper disposed within said layer of insulating material and extending about said zinc cup and having communication with the interior thereof and providing means for preventing excessive pressure within said cell without permitting the liquid contents thereof to escape.

CYRIL P. DEIBEL.